United States Patent
Nakayama (10) Patent No.: US 8,680,964 B2
(45) Date of Patent: Mar. 25, 2014

(54) VEHICLE PRESENCE NOTIFICATION APPARATUS

(75) Inventor: Toshiaki Nakayama, Miyoshi (JP)

(73) Assignee: DENSO Corporation, Kariya (JP)

( * ) Notice: Subject to any disclaimer, the term of this patent is extended or adjusted under 35 U.S.C. 154(b) by 49 days.

(21) Appl. No.: 13/551,896

(22) Filed: Jul. 18, 2012

(65) Prior Publication Data

US 2013/0076504 A1    Mar. 28, 2013

(30) Foreign Application Priority Data

Sep. 27, 2011 (JP) ................................ 2011-210631

(51) Int. Cl.
*G05B 19/00* (2006.01)

(52) U.S. Cl.
USPC ......... 340/5.2; 340/425.5; 340/435; 340/441; 340/463; 340/466

(58) Field of Classification Search
USPC ................ 340/5.2, 425.5, 435, 441, 463, 466
See application file for complete search history.

(56) References Cited

U.S. PATENT DOCUMENTS

| | | | |
|---|---|---|---|
| 4,238,778 A * | 12/1980 | Ohsumi ........................ | 340/903 |
| 8,248,273 B2 * | 8/2012 | Hayashi et al. ............... | 340/943 |
| 2007/0257783 A1 | 11/2007 | Matsumoto et al. | |

FOREIGN PATENT DOCUMENTS

| | | |
|---|---|---|
| JP | 10-201001 | 7/1998 |
| JP | 2002-23300 | 1/2002 |

* cited by examiner

*Primary Examiner* — Tai T Nguyen
(74) *Attorney, Agent, or Firm* — Nixon & Vanderhye P.C.

(57) ABSTRACT

Notice sounds having different sound qualities are generated simultaneously outside a vehicle via an in-vehicle parametric speaker having a first directionality and an in-vehicle dynamic speaker using a vehicular horn unit having a second directionality having a broader emission angle as compared with the first directionality. Both the notice sound via the parametric speaker and the notice sound via the dynamic speaker reach the ears of a person outside the vehicle in different sound pressures based on a difference between the first directionality and the second directionality. A sound tone of a notice sound actually heard by the person outside the vehicle varies according to a travel direction and travel speed of the vehicle.

13 Claims, 10 Drawing Sheets

VEHICLE PRESENCE NOTIFICATION APPARATUS

CROSS REFERENCE TO RELATED APPLICATION

This application is based on Japanese Patent Application No. 2011-210631 filed on Sep. 27, 2011, the disclosure of which is incorporated herein by reference.

TECHNICAL FIELD

The present disclosure relates to a vehicle presence notification apparatus to notify a person outside a vehicle of a presence of the vehicle using a notice sound.

BACKGROUND

Patent document 1: JP H10-201001 A

A visually impaired pedestrian generally recognizes the presence of a vehicle with an engine sound. Vehicles such as an electric vehicle and a fuel cell electric vehicle that travel with an electric motor do not have an internal-combustion engine. Thus, it is not easy for a visually impaired person to notice the presence of a vehicle having no engine. Similarly, a hybrid vehicle stops an engine during low loaded traveling and travel stopping and does not emit any engine sound during stopping the engine. Therefore, it is not easy for a visually impaired person to notice the presence of a hybrid vehicle during stopping the engine.

In addition, there is recently improved a technology to reduce an engine sound so that the engine sound may not be heard by a pedestrian easily. A visually impaired person may not notice the presence of a vehicle with a quiet engine sound under the influence of street noises.

A visually impaired person may raise a recognition accuracy of recognizing a position in a vehicular back and forth direction by using sound information such as a sound tone of an engine sound or a sound tone of a traveling sound and also by combining a variety of sound information, for instance, (i) combining the engine sound and the traveling sound, or (ii) combining the engine sound and the exhaust sound. In particular, a fine sound tone difference between a sound heard by the left ear and a sound heard by the right ear may be distinguished instantaneously to thereby raise a recognition accuracy of recognizing a position in a vehicular back and forth direction.

Figure 10:
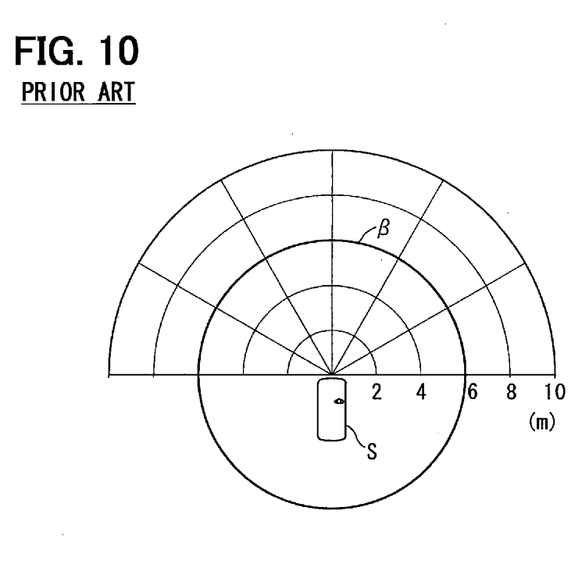
FIG. 10 is a diagram illustrating a transmission distribution of a notice sound from a vehicular horn unit in prior art.

For instance, Patent document 1 proposes a technology to generate a notice sound from an in-vehicle dynamic speaker to emit directly an audible sound outward from the vehicle to indicate the presence of the vehicle to an area surrounding the vehicle. The notice sound emitted from the dynamic speaker is audible in an area surrounding a vehicle S as illustrated as a solid line circle β in FIG. 10.

However, a visually impaired person may not easily distinguish a position in the back and forth direction of the vehicle only by the notice sound generated from the above dynamic speaker. The above explanation was made specifically for a visually impaired person as an example. Even a person with a normal eyesight may recognize a position in the back and forth direction of the vehicle unconsciously by the sound information through the ears. Therefore, it may be desirable that even a person with a normal eyesight recognize a position in the back and forth direction of the vehicle using the sound information.

SUMMARY

It is an object of the present disclosure to provide a vehicle presence notification apparatus to enable a distinction of a position in a vehicular back and forth direction using a notice sound.

To achieve the above object, according to an example of the present disclosure, a vehicle presence notification apparatus in a vehicle is provided for indicating a presence of the vehicle outward from the vehicle. The vehicle presence notification apparatus includes a notice sound preparation portion, a first speaker, a second speaker, and a sound quality diversity portion. The notice sound preparation portion prepares a source signal to generate a predetermined notice sound being audible outside of the vehicle. The first speaker has a first directionality. The second speaker has a second directionality that has a broader emission angle as compared with the first directionality of the first speaker. The sound quality diversity portion prepares a first sound diversity signal and a second sound diversity signal by attaching different frequency characteristics to the source signal prepared by the notice sound preparation portion and inputs the first diversity signal and the second diversity signal to the first speaker and the second speaker, respectively. Herein, the first speaker generates the predetermined notice sound having a first sound quality outside of the vehicle based on the first sound diversity signal. The second speaker generates the predetermined notice sound having a second sound quality outside of the vehicle based on the second diversity signal, the second sound quality being different from the first sound quality. The notice sound having the first sound quality and the notice sound having the second sound quality are simultaneously audible outside of the vehicle.

Under the above configuration, a high directional speaker and a low directional speaker simultaneously generate notice sounds having different sound qualities, respectively. Then, the travel direction and travel speed of the vehicle changes a sound tone of a notice sound actually heard by a person. The sound tone may correspond to a difference between the sound quality of the notice sound by the high directional speaker and the sound quality of the notice sound by the low directional speaker. The change in the sound tone of the audible notice sound enables the distinction of the back and forth direction (heading direction) of the vehicle.

According to another example, a vehicle presence notification apparatus in a vehicle is provided for indicating a presence of the vehicle outward from the vehicle. The vehicle presence notification apparatus includes a first speaker, a second speaker, and a notice sound preparation portion. The first speaker has a first directionality and is a parametric speaker that emits an ultrasonic wave, which is prepared by performing an ultrasonic modulation on a signal, outward from the vehicle. The second speaker has a second directionality having a broader emission angle as compared with the first directionality of the first speaker, and is a dynamic speaker that directly emits a sound. The notice sound preparation portion prepares a source signal by attaching a predetermined notice sound with a plurality of frequencies, which are designated with predetermined frequency intervals, according to a traveling state of the vehicle. The notice sound preparation portion then inputs the source signal to each of the first speaker and the second speaker. Herein, the first speaker emits an ultrasonic wave outward from the vehicle to generate the notice sound with the plurality of frequencies to be audible at a position distant from the vehicle, the ultrasonic wave being prepared by performing an ultrasonic modulation on the source signal. The second speaker emits the notice sound with the plurality of frequencies directly outward from the vehicle based on the source signal.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

An embodiment of the present disclosure will be explained with reference to drawings. A vehicle presence notification apparatus according to an embodiment of the present disclosure indicates a presence of a vehicle using a notice sound. The vehicle presence notification apparatus includes a high directional speaker 100 (e.g., a parametric speaker) having a narrow directionality and a low directional speaker 200 (e.g., a dynamic speaker using a vehicular horn unit) having a broad directionality. The high directional speaker 100 and the low directional speaker 200 simultaneously generate notice sounds having different sound qualities, respectively. The notice sound includes an artificial or dummy engine sound, for example.

Further, for instance, a notice sound during stopping of the vehicle uses an artificial or dummy idling sound to indicate that the vehicle is stopping. A notice sound during moving forward of the vehicle uses an artificial or dummy traveling sound to indicate that the vehicle is moving forward. A notice sound during moving back of the vehicle uses an intermittent sound having higher frequencies to indicate that the vehicle is moving back. Each of the above notice sounds may be prepared such that the artificial engine sound serving as a source signal is attached with another sound or a frequency characteristic.

During moving back of the vehicle, a sound quality of the notice sound may be desirably changed depending on a travel speed of the vehicle. The notice sound may be changed from emphasizing lower frequencies to emphasizing higher frequencies as the travel speed increases.

Yet further, for instance, the artificial engine sound as the source signal is assigned with a large number of frequencies (i.e., a large number of frequency signals) that appear successively with predetermined frequency intervals or widths (XHz). The predetermined frequency interval (XHz) may be referred to as a growl frequency interval or growl frequency width. In this embodiment, the growl frequency width may be changed according to the travel speed. The growl frequency is set to the narrowest frequency width when the vehicle is stopping. The growl frequency width is increased continuously or step-wise as the speed of moving forward increases.

EXAMPLES

The examples will explain a vehicle presence notification apparatus used for a vehicle that generates a quiet sound in the traveling state or the stopping state. Such a vehicle includes (i) a vehicle such as an electric vehicle and a fuel cell electric vehicle that has no engine, and (ii) a vehicle such as a hybrid vehicle that can stop an engine during traveling and stopping.

The following will explain specific examples to which an embodiment of the present disclosure is applied with reference to drawings. The example described in the following is a detailed example; naturally, the present disclosure is thus not limited to the examples. In the following examples, ones having the same reference number have the same function.

Example 1

Figure 1:
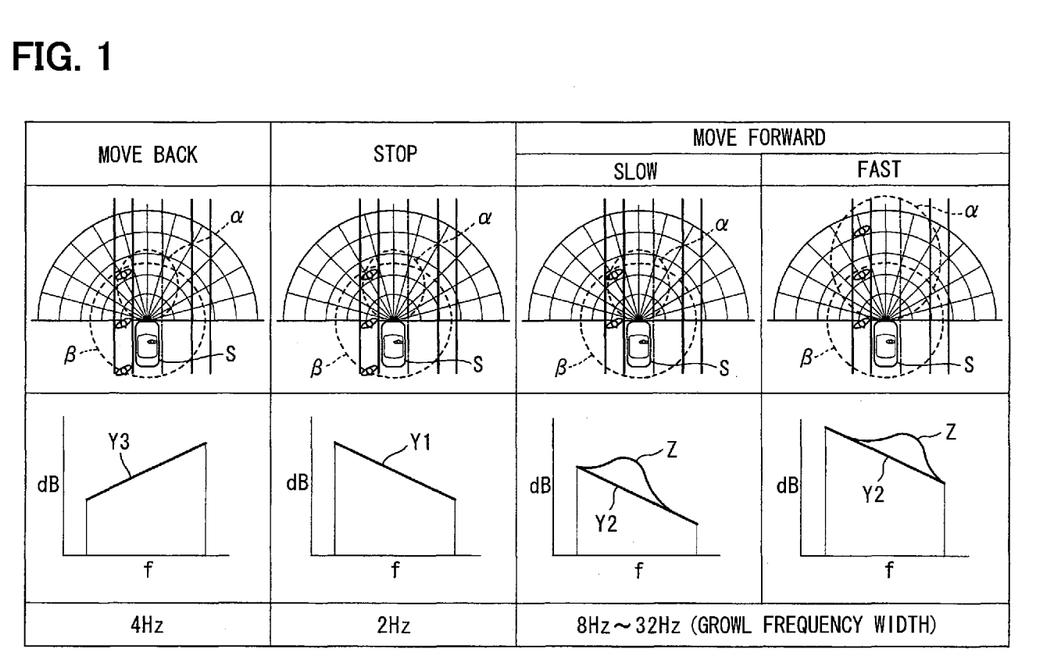
FIG. 1 is a diagram illustrating the relation of travel states of a vehicle, transmission distributions of a notice sound, frequency characteristics of the notice sound, and growl frequency widths according to an embodiment of the present disclosure.
Figure 2:
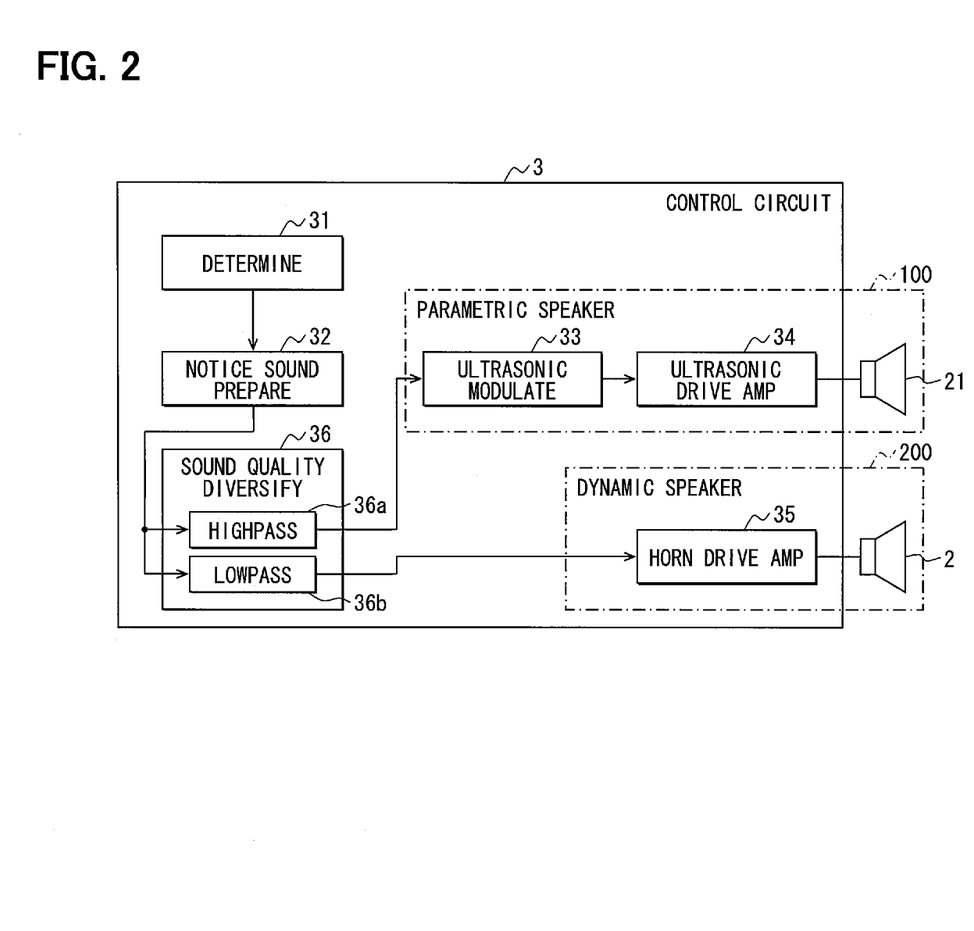
FIG. 2 is a diagram illustrating a schematic configuration of a vehicle presence notification apparatus according to Example 1 of the embodiment of the present disclosure.

Example 1 will be explained with reference to FIGS. 1 to 7. The vehicle presence notification apparatus indicates a presence of a subject vehicle to a pedestrian using a notice sound. The vehicle presence notification apparatus includes a parametric speaker 100, a dynamic speaker 200 using a vehicular horn unit 2, and a control circuit 3 which performs an operation control of the parametric speaker 100 and the dynamic speaker 200, as illustrated in FIG. 2.

(Explanation of Vehicular Horn Unit 2)

Figure 3:
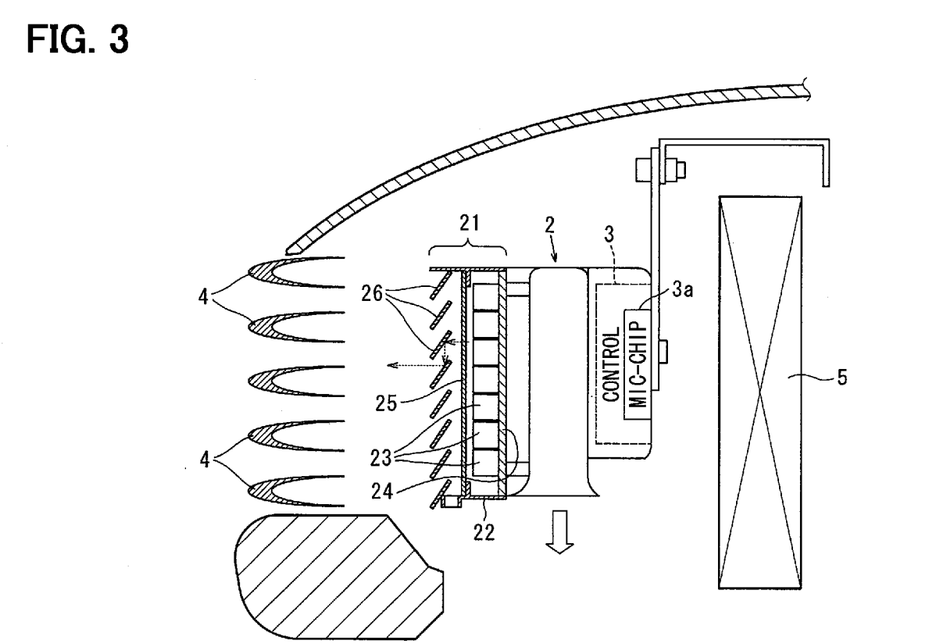
FIG. 3 is a diagram illustrating a configuration of a high directional speaker and a low directional speaker in a vehicle.

As illustrated in FIG. 3, the vehicular horn unit 2 is disposed fixedly in between a front grille 4 and a heat exchanger 5 for air-conditioning. The vehicular horn unit 2 is an electromagnetic alarming horn unit that generates an alarm sound when a vehicle occupant manipulates a horn switch (e.g., a horn button in the steering wheel). The alarm sound is generated by giving the self-excitation voltage greater than a threshold value in direct current (e.g., a battery voltage of 8 V or more).

A detailed example of the vehicular horn unit 2 will be explained with reference to FIGS. 4A, 4B. The vehicular horn unit 2 includes the following: a coil 11 which generates a magnetic force on electric current application; a fixed iron core (magnetic attraction core) 12 which generates a magnetic attraction power due to a magnetic force generated by the coil 11; a moving iron core (movable core) 14, which is supported by a central portion of a vibrating plate (i.e., diaphragm) 13 and is movable towards the fixed iron core 12; and a moving contact 16, which follows a movement of the moving iron core 14 and separates from a fixed contact 15 based on the movement of the moving iron core 14 towards the fixed iron core 12, thereby shutting down an electric current application to the coil 11.

Application of a direct-current self excitation voltage equal to or greater than a threshold value (e.g., 8 V) to both current application terminals of the coil 11 of the vehicular horn unit 2 enables the repetition of the following two movements in series: (i) an attraction movement for the moving iron core 14 to undergo a magnetic attraction towards the fixed iron core 12 due to a current application to the coil 11 so that the moving contact 16 becomes separate from the fixed contact 15 to stop the current application to the coil 11; and (ii) a restoration movement for the vibrating plate 13 to provide an operation of a return spring to the moving iron core 14 due to the stop of the current application, returning the moving iron core 14 to the initial position so that the moving contact 16 contacts the fixed contact 15 to re-start the current application to the coil 11.

That is, the fixed contact 15 and the moving contact 16 form a current interrupter 17 which generates an intermittent electric current application to turn on and off the current application to the coil 11. Thus, such intermittent electric current application to the coil 11 (i.e., intermittent occurrence of the magnetic attraction power of the fixed iron core 12) causes the vibrating plate 13 as well as the moving iron core 14 to vibrate, resulting in the generation of an alarm sound from the vehicular horn unit 2. When the self-excitation voltage is given to the vehicular horn unit 2, the frequency characteristic of the alarm sound generated by the vehicular horn unit 2 is illustrated in the solid line A of FIG. 5.

Figure 5:
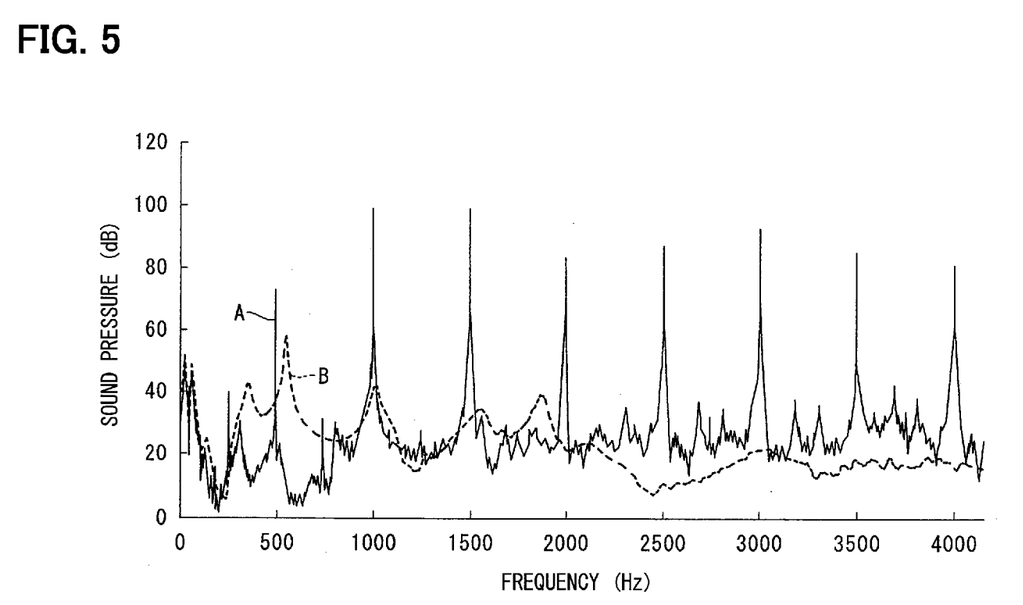
FIG. 5 is a diagram illustrating frequency characteristics of the vehicular horn unit in cases of applying self-excitation and separate-excitation.

In contrast, the vehicular horn unit 2 is used as a dynamic speaker 200 by providing the drive signal having the separate-excitation voltage (for example, less than 8V) lower than the self-excitation voltage. That is, the vehicular horn unit 2 is given a notice-sound generating drive signal having the separate-excitation voltage, and emits the notice sound directly. The notice-sound generating drive signal is equivalent to a signal for generating a notice sound. The broken line B in FIG. 5 illustrates the frequency characteristic of the vehicular horn unit 2 used as the dynamic speaker 200. This broken line B is a frequency characteristic in case that a sweep signal (a variable signal from a low frequency to a high frequency) of a sine wave of 1V is provided to the vehicular horn unit 2.

Figure 4A:
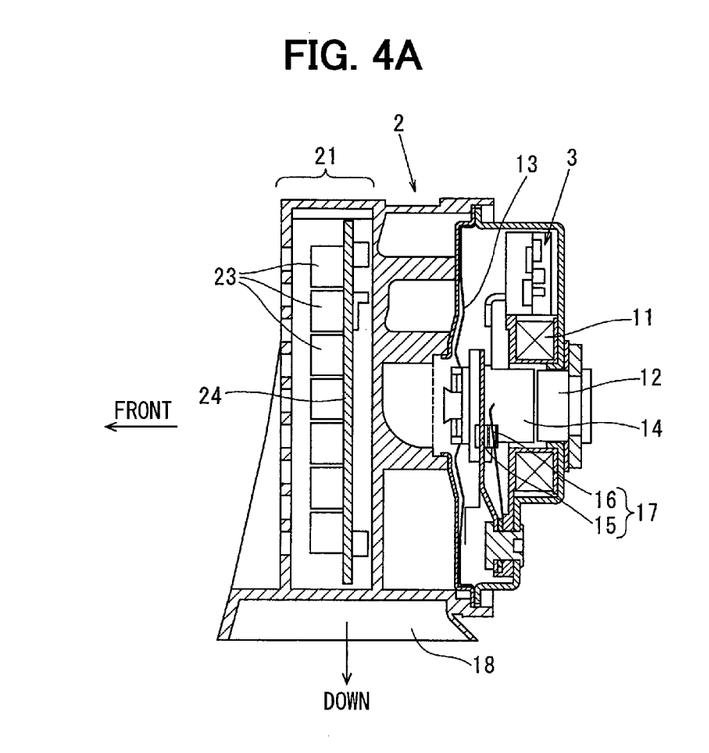
FIG. 4A is a sectional view of a configuration for explaining a vehicular horn unit.
Figure 4B:
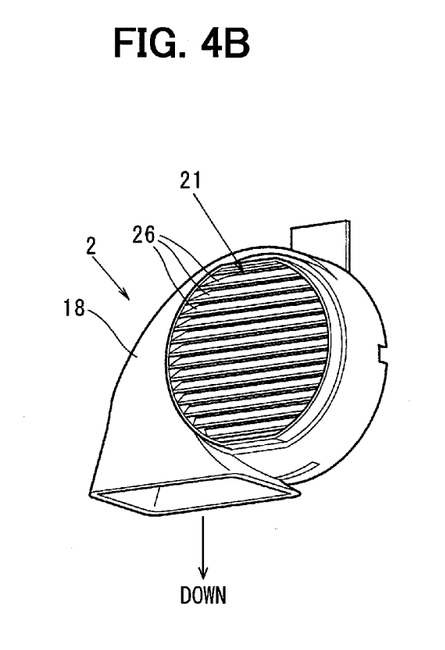
FIG. 4B is a perspective view for explaining a louver.

The vehicular horn unit 2 includes a spiral horn 18 (spiral trumpet member: spiral sound tub), which amplifies the alarm sound by the vibration of the vibrating plate 13 and emits it outward from the vehicle, as illustrated in FIGS. 4A, 4B. The vehicular horn unit 2 of this example is provided to emit the notice sound such that the emitted notice sound reaches the periphery of the vehicular horn unit 2 approximately uniformly from the viewpoint above the vehicle S (refer to the broken line β in FIG. 1). That is, the vehicular horn unit 2 functions as an indirectional or omni-directional speaker, which does not have a directionality in the horizontal plane relative to the vehicle on earth or road, and used as an example of a low directional speaker. For instance, the spiral horn 18 of the vehicular horn unit 2 is disposed such that an opening is directed at downward of the vehicle (in a direction facing a road surface). It is noted that the direction of the opening of the spiral horn 18 need not be limited to the downward direction. In addition, the emission direction of the sonic wave may be changed to an arbitrary direction using a sound reflector etc.

(Explanation of Parametric Speaker 100)

The parametric speaker 100 applies an ultrasonic modulation to a waveform signal of an audible sound (notice sound), and emits an ultrasonic wave as a modulated signal from an ultrasonic speaker 21. The ultrasonic wave (sonic wave not heard by an ear of a human being) emitted from the ultrasonic speaker 21 contains modulated components, which will undergo a self-demodulation in the air in a course of the transmission or propagation. An audible sound (i.e., notice sound) is thereby generated (i.e., become audible) at a position distant from the ultrasonic speaker 21 or the vehicle.

The ultrasonic speaker 21 used in the parametric speaker 100 is an ultrasonic generation unit to generate an aerial vibration of a frequency (not less than 20 kHz) higher than a human being's audible region. The ultrasonic speaker 21 is mounted in the vehicle so as to emit the ultrasonic wave forward or frontward from the vehicle. That is, the ultrasonic speaker 21 in the parametric speaker 100 is used as an example of a high directional speaker having a strong or narrow directionality. As a detailed example, the ultrasonic speaker 21 of this example is attached to the spiral horn 18 of the vehicular horn unit 2. The spiral horn 18 is attached such that the surface where the spiral is formed is located at the front of the vehicle. Thus, the ultrasonic speaker 21 emits the ultrasonic wave forward from the vehicle.

The ultrasonic speaker 21 includes an ultrasonic speaker housing 22 and several ultrasonic vibrators 23. The ultrasonic speaker housing 22 is made of resin and attached to or integrated with the spiral horn 18. The several ultrasonic vibrators 23 are arranged inside of the ultrasonic speaker housing 22. The ultrasonic vibrator 23 is a piezoelectric speaker having a known configuration to include a piezoelectric element that is extended and contracted according to an applied voltage (charge and discharge), and an ultrasonic vibrating plate that is driven by expansion and contraction of the piezoelectric element to thereby generate waves of condensation and rarefaction in air. The several ultrasonic vibrators 23 are arranged on a support plate 24 disposed inside of the ultrasonic speaker housing 22, and mounted as a speaker array.

Further, the ultrasonic speaker 21 is equipped with an opening (ultrasonic emission opening) which emits the ultrasonic wave from the ultrasonic vibrators 23 forward from the vehicle. This opening is equipped with a waterproof means to prevent rain water from entering the area where the ultrasonic vibrators 23 are mounted. For instance, the waterproof means includes a waterproof sheet 25 covering an opening but allowing the transmission of ultrasonic waves, and a louver 26 placed in front of the waterproof sheet 25. FIG. 4A does not illustrate the waterproof sheet 25 and the louver 26.

(Explanation of Control Circuit 3)

The control circuit 3 contains a known microcomputer chip 3a having a CPU for processing data, a storage means (memory) for storing programs, an input circuit, and an output circuit. The control circuit 3 may be mounted inside of a horn housing of the vehicular horn unit 2, as illustrated in FIG. 3. The control circuit 3 may be mounted in the vehicle as an independent body separated from the vehicular horn unit 2. The control circuit 3 receives vehicle information on travel state of the vehicle such as vehicle speed signal, from an ECU (Engine Control Unit). When the operating condition is satisfied to report the presence of the vehicle, the control circuit 3 drives the ultrasonic speaker 21 and the vehicular horn unit 2 to generate a notice sound outside the vehicle.

The control circuit 3 includes the following, as illustrated in FIG. 2: (a) a determination portion 31 to determine whether a driving state or travel state of the vehicle matches with a notice sound generation condition; (b) a notice sound preparation portion 32 to prepare a source signal that is prepared to generate a predetermined notice sound according to a vehicle travel state (moving back, stopping, and moving forward); (c) a sound quality diversity portion 36 to prepare a first sound quality diversity signal and a second sound quality diversity signal by attaching the source signal with predetermined frequency characteristics, respectively; (d) an ultrasonic modulation portion 33 to perform an ultrasonic modulation on the first sound quality diversity signal outputted from the sound quality diversity portion 36 to output an ultrasonic-modulated signal; (e) an ultrasonic driving amplifier 34 to drive the ultrasonic speaker 21 with the ultrasonic-modulated signal outputted from the ultrasonic modulation portion 33; and (f) a horn driving amplifier 35 to drive the vehicular horn unit 2 based on the second sound quality diversity signal outputted from the sound quality diversity portion 36. The above portions (a)-(f) of the control circuit 3 will be explained below.

(Explanation of Determination Portion 31)

For example, when the driving switch is turned on and the vehicle speed is less than a predetermined speed (for example, 20 km/h), the determination portion 31 determines that the driving state of the vehicle matches with a generation condition of a notice sound, and activates the notice sound preparation portion 32.

(Explanation of Notice Sound Preparation Portion 32)

The notice sound preparation portion 32 includes a notice sound preparation program (sound software), and prepares a source signal that is a signal for generating a notice sound using digital technique when receiving the activation instruction from the determination portion 31.

It is noted that a source signal may be a signal for generating an artificial engine sound that simulates a sound of an engine of a vehicle, for instance. Further, the source signal may be a signal prepared by attaching an artificial engine sound with a frequency characteristic, which will be explained below. Such a source signal is inputted to the sound quality diversity portion 36 in the following explanation.

The notice sound preparation portion 32 operates as follows: (i) preparing a signal for generating an artificial idling sound during stopping (shift lever set to "stop"), (ii) preparing a signal for generating an artificial traveling sound during moving forward (shift lever set to "drive"), and (iii) preparing a signal for generating an intermittent notice sound to indicate the backing of the vehicle during moving back (shift lever set to "reverse").

The following will explain specific examples of preparation of a signal for generating a notice sound by the notice sound preparation portion 32. The notice sound preparation portion 32 prepares a frequency signal (waveform signal) based on a clock signal prepared by a reference clock (crystal oscillator) contained in the microcomputer chip 3a, and prepares simultaneously a plurality of frequencies (i.e., a plurality of frequency signals, also referred to growl frequencies) that are aligned with predetermined frequency intervals or widths XHz (also referred to as growl frequency widths), thereby preparing a signal for generating a notice sound such as an artificial idling sound.

In this example, the growl frequency width may be changed according to the travel state (vehicle speed signal given to the control circuit 3) of the vehicle. FIG. 1 illustrates specific examples as follows. (i) The growl frequency width is set to 2 Hz when the vehicle speed is 0 km/h (during stopping). (ii) The growl frequency width is set to change from 8 Hz to 32 Hz continuously or stepwise according to the increase of the vehicle speed. (iii) The growl frequency width is set to 4 Hz during moving back.

Figure 6:
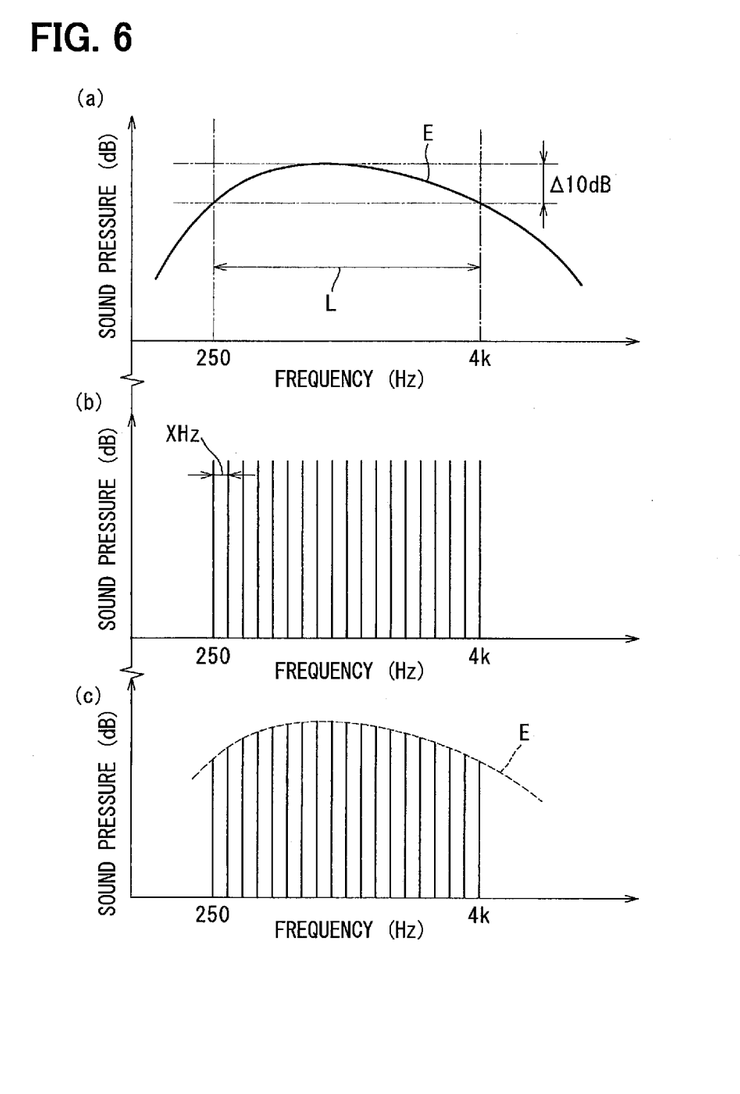
FIG. 6 is a diagram for explaining a preparation of a notice sound attached with a growl frequency width.

In addition, the notice sound preparation portion 32 includes a frequency range specification means (program) that prepares a plurality of frequency signals standing or appearing with the growl frequency widths in a predetermined frequency band L (notice sound generating area), as illustrated in (b) of FIG. 6.

Furthermore, as illustrated in (c) of FIG. 6, the notice sound preparation portion 32 includes a frequency characteristic processing means (program) to attach the frequency characteristic E to a plurality of frequency signals standing with growl frequency widths for generating a notice sound. The frequency characteristic E illustrated in (a) of FIG. 6 may be an artificial engine sound that simulates an engine sound. In this example, the frequency characteristic E illustrated in (a) of FIG. 6 is provided so as to change according to the travel state (vehicle speed signal given to the control circuit 3) of the vehicle.

The following will explain specific examples with reference to FIG. 1. (i) During stopping (0 km/h), an artificial engine sound at the time of idling is expressed with a frequency characteristic that increases the sound pressure in the lower frequencies (see solid line Y1). (ii) During moving forward, an change of the traveling sound according to the increase of the vehicle speed is expressed by changing the emphasizing zone Z from the lower frequencies to the higher frequencies with respect to the frequency characteristic (see solid line Y2). (iii) During moving back, the moving-back signal (for instance, sound signal of an alarming sound adopted in trucks) is expressed with the frequency characteristic increasing the sound pressure in the higher frequencies (see solid line Y3).

(Explanation of Sound Quality Diversity Portion 36)

The sound quality diversity portion 36 attaches the source signal prepared by the notice sound preparation portion 32 with different frequency characteristics to thereby prepare the first and second sound quality diversity signals, respectively. For example, in this Example 1, a highpass filter 36a and a lowpass filter 36b are included in the sound quality diversity portion 36. The highpass filter 36a is an electronic filter that passes signals with frequencies higher than a predetermined first cutoff frequency but attenuates signals with frequencies lower than the predetermined first cutoff frequency. The first cutoff frequency may be 1 KHz, for instance. In contrast, the lowpass filter 36b is an electronic filter that passes signals with frequencies lower than a predetermined second cutoff frequency but attenuates signals with frequencies higher than the second cutoff frequency. The second cutoff frequency may be 1 KHz, for instance. This first sound quality diversity signal may be referred to as the source signal attached with a first frequency characteristic so as to attach a first sound quality to the notice sound. In contras, the second sound quality diversity signal may be referred to as the source signal attached with a second frequency characteristic so as to attach a second sound quality to the notice sound. Furthermore, the sound quality diversity portion 36 may take part of roles of the above-mentioned notice sound preparation portion 32. That is, the notice sound preparation portion 32 may prepare only an artificial engine sound as a source signal, whereas the sound quality diversity portion 36 may take all the other part of the roles other than preparing the source signal.

(Explanation of Ultrasonic Modulation Portion 33)

The ultrasonic modulation portion 33 performs an ultrasonic modulation on the first sound quality diversity signal outputted by the sound quality diversity portion 36. For instance, the ultrasonic modulation portion 33 adopts an AM modulation (amplitude modulation), which modulates the first sound quality diversity signal outputted by the sound quality diversity portion 36 to an amplitude change (increase and decrease change in voltage) of a predetermined ultrasonic frequency (for example, 25 kHz). There is no need to be limited to the amplitude modulation. For instance, a PWM modulation (pulse width modulation) may be adopted to modulate the first sound quality diversity signal outputted by the sound quality diversity portion 36 to a predetermined pulse width change (width between generation times of the pulses) of a predetermined ultrasonic frequency.

A specific example of the ultrasonic modulation by the ultrasonic modulation portion 33 will be explained with reference to FIG. 7. For example, a signal for generating a notice sound may be a signal for generating an artificial engine sound, an artificial idling sound, or an artificial traveling sound. It is assumed that the signal for generating a notice sound provides a voltage change illustrated in (a) of FIG. 7. Note that a waveform of only a single frequency is illustrated for simplifying the explanation. In contrast, an ultrasonic oscillator contained in the control circuit 3 oscillates on the ultrasonic frequency illustrated in (b) of FIG. 7.

Then, as illustrated in (c) of FIG. 7, the ultrasonic modulation portion 33 operates as follows: (i) depending on the increase of the voltage of each frequency signal of the first sound quality diversity signal, an amplitude of the voltage due to the ultrasonic vibration is enlarged; and (ii) depending on the decrease of the voltage of each frequency signal of the first sound quality diversity signal, an amplitude of the voltage due to the ultrasonic vibration is reduced. Thus, the ultrasonic modulation portion 33 modulates the first sound quality diversity signal outputted from the sound quality diversity portion 36 to the amplitude change in oscillating voltage of the ultrasonic frequency.

(Explanation of Ultrasonic Driving Amplifier 34)

The ultrasonic driving amplifier 34 is an amplification means to drive the ultrasonic speaker 21 based on the ultrasonic signal modulated in the ultrasonic modulation portion 33 (i.e., the first sound quality diversity signal having undergone the ultrasonic modulation), and controls an applied voltage (charge and discharge status) to each ultrasonic vibrator 23, thereby generating the ultrasonic wave prepared by modulating the first sound quality diversity signal from each ultrasonic vibrator 23.

(Explanation of Horn Driving Amplifier 35)

The horn driving amplifier 35 is a power amplifier for activating or operating the vehicular horn unit 2 as a dynamic speaker, and amplifies the second sound quality diversity signal outputted by the sound quality diversity portion 36 to provide the amplified signal to the current application terminal of the vehicular horn unit 2. When the notice sound is generated from the vehicular horn unit 2, the horn driving amplifier 35 controls a current application to the coil 11 of the vehicular horn unit 2 so as not to turn on and off the current interrupter 17 (i.e., so as not to output an alarming sound).

In this example, a sound pressure variation portion is provided to vary a sound pressure of the notice sound by the parametric speaker 100 according to the vehicle speed. The sound pressure variation portion increases the sound pressure of the notice sound by the parametric speaker 100 as the vehicle speed increases. The sound pressure variation portion varies an amplification gain of the ultrasonic driving amplifier 34.

A specific example will be explained with reference to FIG. 1. The propagation range of the notice sound by the parametric speaker 100 is illustrated in the broken line a of FIG. 1; the propagation range of the notice sound by the vehicular horn unit 2 is illustrated in the broken line β in FIG. 1. The sign S indicates the vehicle. The broken lines α, β60 illustrate the propagation range whose sound pressure of the notice sound is 50 dB. As easily known from "MOVING FORWARD" "FAST" in FIG. 1, the sound pressure from the parametric speaker 100 is increased in the travel state of moving forward as compared with other travel states relative to the parametric speaker 100. Further, the sound pressure from the dynamic speaker 200 is maintained unchanged regardless of the travel states, for instance.

Specifically, the sound pressure variation portion operates depending on the vehicle speed as follows. It may vary the power supply voltage (supply voltage) of the ultrasonic driving amplifier 34. It may vary the signal voltage just before the final amplification of the ultrasonic driving amplifier 34. It may change the number of used ultrasonic vibrators. In addition, the amplification gain by the sound pressure variation portion may be varied continuously or stepwise. Further, the sound pressure variation portion may increase the sound pressure of the notice sound not only according to the vehicle speed but also the travel state in rainy weather or snowy weather.

(Operation of Vehicle Presence Notification Apparatus)

The determination portion 31 determines that the driving state of the vehicle matches with a generation condition of a notice sound. The notice sound preparation portion 32 thereby outputs a signal for generating a notice sound as a source signal according to the driving state of the vehicle.

Figure 7:
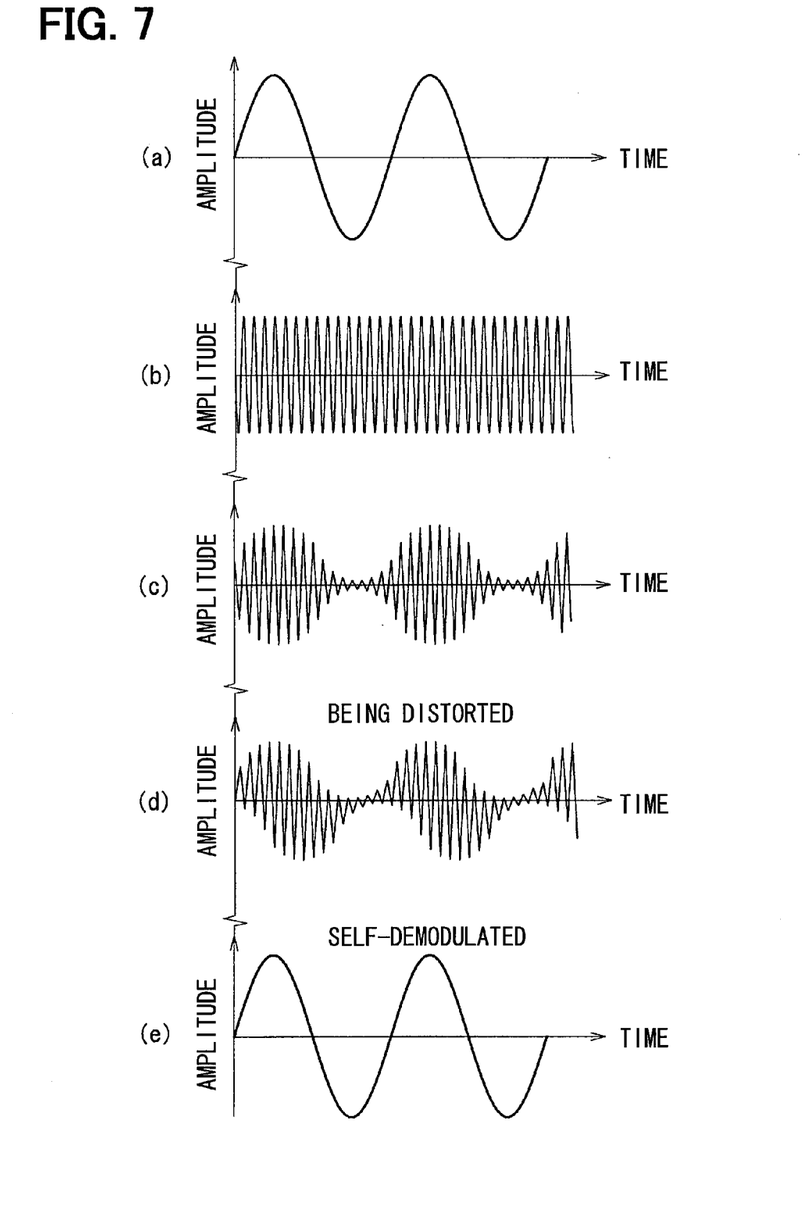
FIG. 7 is a diagram for explaining a principle of a parametric speaker.

The ultrasonic speaker 21 emits the ultrasonic wave, which is inaudible and prepared by ultrasonic-modulating the first sound quality diversity signal, forward from the vehicle, as illustrated in (c) of FIG. 7. As the ultrasonic wave propagates in the air, the ultrasonic wave having short wavelength is distorted and smoothed by virtue of the viscosity of the air, as illustrated in (d) of FIG. 7.

As illustrated in (e) of FIG. 7, the amplitude components contained in the ultrasonic wave undergo the self-demodulation during the propagating in the air, resulting in reproduction of the notice sound with the first sound quality in an area distant from the emission source of the ultrasonic waves or forward from the vehicle having the ultrasonic speaker 21. As explained above, the propagation range of the notice sound by the parametric speaker 100 is illustrated in the broken line a of FIG. 1. The sign S indicates the vehicle. The broken line a illustrates the propagation range whose sound pressure of the notice sound is 50 dB.

In contrast, the dynamic speaker 200 outputs the second sound quality diversity signal via the vehicular horn unit 2 to thereby directly generate the notice sound with the second sound quality according to the traveling state of the vehicle in the periphery of the vehicle. As explained above, the propagation range of the notice sound by the vehicular horn unit 2 is illustrated in the broken line β in FIG. 1. The broken line β in FIG. 1 illustrates the propagation range providing the sound pressure of the notice sound of 50 dB.

[Effect 1 of Example 1]

The vehicle presence notification apparatus of this example generates the notice sounds of different sound qualities simultaneously from both the parametric speaker 100 (an example of the high directional speaker), and the dynamic speaker 200 (an example of the low directional speaker).

In this example, the same notice sound is reproduced via both the parametric speaker 100 and the dynamic speaker 200. It is noted that a clear difference is present between the frequency characteristic or sound quality of the notice sound reproduced by the parametric speaker 100 and the frequency characteristic or sound quality of the notice sound reproduced by the vehicular horn unit 2 of the dynamic speaker 200. In specific, the notice sound reproduced by the parametric speaker 100 is a hard sound quality; in contrast, the notice sound reproduced by the vehicular horn unit 2 of the dynamic speaker 200 is a soft sound quality. Therefore, even if the same notice sounds are reproduced via both the parametric speaker 100 and the vehicular horn unit 2, the difference is found between the sound quality of the notice sound generated by the parametric speaker 100 and the sound quality of the notice sound generated by the vehicular horn unit 2. Consequently, the vehicle presence notification apparatus of this example generates the notice sounds of different sound qualities simultaneously from both the parametric speaker 100 (an example of the high directional speaker), and the dynamic speaker 200 (an example of the low directional speaker).

It is noted that a sound tone of a notice sound actually heard by a person may correspond to a difference between the sound quality of the notice sound by the parametric speaker 100 and the sound quality of the notice sound by the vehicular horn unit 2. Such a sound tone of a notice sound actually heard may change according to the travel direction and travel speed of the vehicle. The change in the sound tone of the notice sound actually heard enables the distinction of the back and forth direction (heading direction) and the speed of the vehicle.

[Effect 2 of Example 1]

The vehicle presence notification apparatus according to present Example 1 operates as follows: (i) generating an artificial idling sound during stopping; (ii) generating an artificial traveling sound during moving forward; and (iii) generating a moving-back notice sound during moving back.

Thereby, a pedestrian may be provided with the following effect in addition to "Effect 1 of Example 1" mentioned above. (i) Noticing the presence of the vehicle stopping by the artificial idling sound; (ii) Noticing the presence of the vehicle moving forward by the artificial traveling sound; and (iii) Noticing the presence of the vehicle moving back by the moving-back notice sound.

Further, the notice sound actually heard by a pedestrian may switch among the artificial idling sound, the artificial traveling sound, and the moving-back notice sound. Thus, the pedestrian may recognize the change of the travel state of the vehicle such as from the stopping to moving forward, from moving forward to stopping, from stopping to moving back, and from moving back to stopping.

[Effect 3 of Example 1]

The vehicle presence notification apparatus of Example 1 changes the growl frequency width according to the vehicle speed. Therefore, the vehicle speed may be recognized from the change of the notice sound or change of the growl frequency width.

Furthermore, Example 1 shifts the emphasis frequency zone Z from the lower frequency side to the higher frequency side according to the increase in the vehicle speed, in addition to the increase of the growl frequency width, according to the increase in the vehicle speed. This enables the notice sound to simulate that the frequency characteristic of the engine sound and load noise changes according to the increase of the vehicle speed. This enables the recognition of the change in the vehicle speed from the change in the emphasis frequency zone Z of the artificial traveling sound.

Example 2

Example 2 will be explained with reference to FIG. 8. In present Example 2, one having the same reference number as that of one in Example 1 has the same function as that of the one in Example 1. In above Example 1, the sound quality diversity portion 36 differentiates the notice sound into the sound quality of the notice sound that will be generated by the parametric speaker 100 and the sound quality of the notice sound that will be generated by the dynamic speaker 200.

In contrast, the control circuit 3 of this Example 2, a tone control portion 37 is provided to use a lowpass filter, and attaches the frequency characteristic to the source signal prepared by the notice sound preparation portion 32 to thereby prepare the second sound quality diversity signal and input it into the dynamic speaker 200. In contrast, the parametric speaker 100 is provided to receive directly the source signal prepared by the notice sound preparation portion 32 as a second sound quality diversity signal. It is noted that the notice sound preparation portion 32 and the tone control portion 37 may function as a sound quality diversity portion, in this Example 2.

Figure 8:
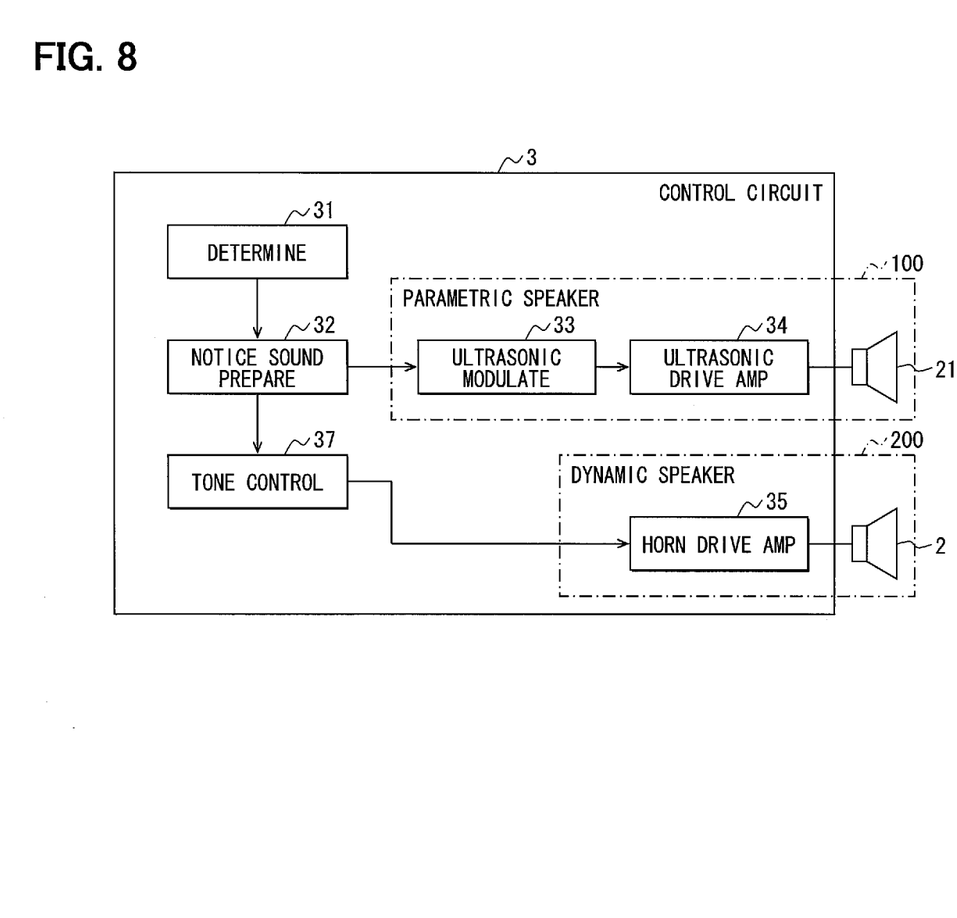
FIG. 8 is a diagram illustrating a schematic configuration of a vehicle presence notification apparatus according to Example 2.

FIG. 8 illustrates a specific example of a control circuit 3 in Example 1. Like Example 1, the notice sound preparation portion 32 is provided to prepare a source signal that is a signal for generating a notice sound according to the travel state of the vehicle such as stopping, moving forward, and moving back. The tone control portion 37 is provided to change the frequency characteristic of the source signal which is given to the horn driving amplifier 35. Such a configuration can intentionally change only the frequency characteristic of the signal for generating the notice sound which drives the vehicular horn unit 2, thereby differentiating (i) the frequency characteristic of the signal for generating the notice sound which drives the parametric speaker 100, and (ii) the frequency characteristic of the signal for generating the notice sound which drives the vehicular horn unit 2, from each other.

The above configuration may be simpler as compared with Example 1, in differentiating the sound quality of the notice sound generated by the parametric speaker 100 and the sound quality of the notice sound generated by the vehicular horn unit 2 from each other. Therefore, like Example 1, a sound tone of a notice sound actually heard by a person may correspond to the difference between the sound quality of the notice sound by the parametric speaker 100 and the sound quality of the notice sound by the vehicular horn unit 2. Such a sound tone of a notice sound actually heard may change significantly according to the travel direction and travel speed of the vehicle. The change in the sound tone of the notice sound actually heard enables the easy distinction of the back and forth direction (heading direction) of the vehicle and the vehicle speed.

Example 3

Example 3 will be explained with reference to FIG. 9. In above Example 1, differentiation is made between (i) the frequency characteristic of the signal for generating the notice sound which drives the parametric speaker 100, and (ii) the frequency characteristic of the signal for generating the notice sound which drives the dynamic speaker 200, by using the highpass filter and the lowpass filter, respectively.

In contrast, the control circuit 3 of Example 3 differentiates according to the driving state such as stopping, moving forward, and moving back, (i) the growl frequency width used when preparing the first sound quality diversity signal which drives the parametric speaker 100, and (ii) the growl frequency width used when preparing the second sound quality diversity signal which drives the dynamic speaker 200, from each other.

Figure 9:
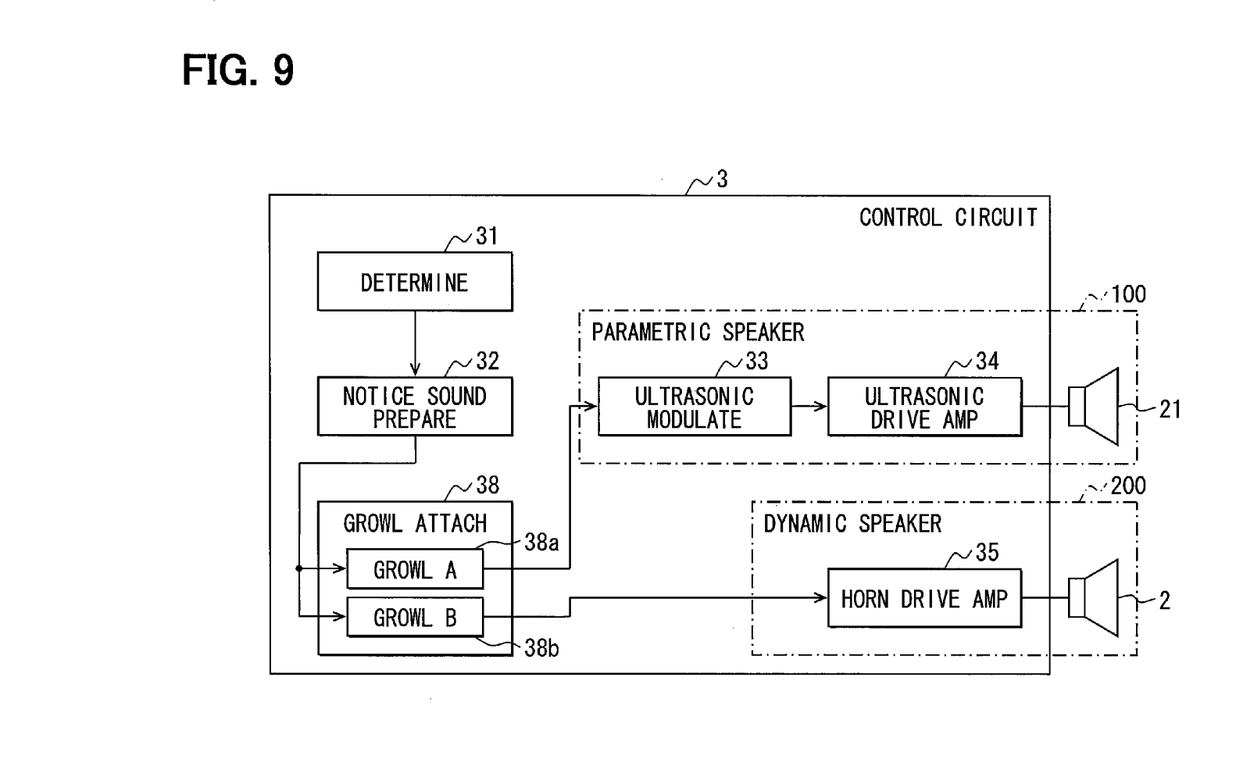
FIG. 9 is a diagram illustrating a schematic configuration of a vehicle presence notification apparatus according to Example 3.

FIG. 9 illustrates a specific example of the control circuit 3 of Example 3. The control circuit 3 includes the notice sound preparation portion 32 to prepare a source signal for generating an artificial engine sound, and a sound quality diversity portion 38 to contain (i) a first growl sound preparation portion 38a to prepare a first sound quality diversity signal which is inputted into the parametric speaker 100, and (ii) a second growl sound preparation portion 38b to prepare a second sound quality diversity signal which is inputted into the dynamic speaker 200.

In other words, the sound quality diversity portion 38 differentiates, according to the driving state such as stopping, moving forward, and moving back, (i) the growl frequency width used when preparing the first sound quality diversity signal which drives the parametric speaker 100, and (ii) the growl frequency width used when preparing the second sound quality diversity signal which drives the dynamic speaker 200, from each other.

Such a configuration enables the clear distinction between the sound quality of the notice sound generated by the parametric speaker 100 and the sound quality of the notice sound generated by the vehicular horn unit 2. An audible sound tone of the notice sound heard by a person varies significantly depending on a travel direction and a travel speed of the vehicle. The sound tone of the notice sound heard by the person corresponds to the difference in the sound qualities between the notice sound by the parametric speaker 100 and the notice sound by the vehicular horn unit 2. The change in the sound tone of the notice sound enables the easy distinction of the back and forth direction (heading direction) of the vehicle and the vehicle speed.

The above examples of the embodiment may be combined in various manners. The above examples explain a vehicle driven by an electric motor such as an electric vehicle, fuel cell electric vehicle, and hybrid vehicle. Without need to be limited thereto, the embodiment may be applied to a conventional vehicle with an engine having an idling stop function. Further, the embodiment may be applied to a conventional vehicle, which has no idling stop function but provides a quiet engine sound.

In above examples, the parametric speaker 100 is used as an example of the high directional speaker. The high directional speaker may use a strong directional dynamic speaker, e.g., including a horn which emits a sound mainly forward from the vehicle.

In above examples, the notice sound includes "artificial engine sound," "artificial idling sound," "artificial traveling sound," and "moving-back notice sound." Without need to be limited thereto, another type of a notice sound may be used as far as it can indicate a presence of a vehicle.

As explained above, a source signal that is prepared by the notice sound preparation portion 32 is inputted to the sound quality diversity portion 36. In this regard, however, there is no need to be limited thereto. That is, for instance, when a source signal is prepared by attaching an artificial engine sound with a plurality of frequencies such as growl frequencies that is mentioned above, such a source signal may be inputted directly each of the parametric speaker 100 and the dynamic speaker 200 while bypassing the sound quality diversity portion 36.

Aspects of the disclosure described herein are set out in the following clauses.

According an aspect of the present disclosure, a vehicle presence notification apparatus in a vehicle is provided for indicating a presence of the vehicle outward from the vehicle. The vehicle presence notification apparatus includes a notice sound preparation portion, a first speaker, a second speaker, and a sound quality diversity portion. The notice sound preparation portion prepares a source signal to generate a predetermined notice sound being audible outside of the vehicle. The first speaker has a first directionality. The second speaker has a second directionality that has a broader emission angle as compared with the first directionality of the first speaker. The sound quality diversity portion prepares a first sound diversity signal and a second sound diversity signal by attaching different frequency characteristics to the source signal prepared by the notice sound preparation portion and inputs the first diversity signal and the second diversity signal to the first speaker and the second speaker, respectively. Herein, the first speaker generates the predetermined notice sound having a first sound quality outside of the vehicle based on the first sound diversity signal. The second speaker generates the predetermined notice sound having a second sound quality outside of the vehicle based on the second diversity signal, the second sound quality being different from the first sound quality. The notice sound having the first sound quality and the notice sound having the second sound quality are simultaneously audible outside of the vehicle.

According to an optional aspect, the sound quality diversity portion may prepare the first sound diversity signal and the second sound diversity signal by attaching the different frequency characteristics to the source signal prepared by the notice sound preparation portion, according to a traveling state of the vehicle.

According to an optional aspect, before the sound quality diversity portion prepares the first sound diversity signal and the second sound diversity signal by attaching the different frequency characteristics, the source signal prepared by the notice sound preparation portion may be attached with a plurality of frequencies, which are designated with predetermined frequency intervals, according to a traveling state of the vehicle.

According to an optional aspect, the first speaker may be a parametric speaker that emits an ultrasonic wave outward from the vehicle, generating the notice sound having the first sound quality to be audible at a position distant from the vehicle, the ultrasonic wave being prepared by performing an ultrasonic modulation on the first sound diversity signal. The second speaker may be a dynamic speaker that directly emits the notice sound having the second sound quality outward from the vehicle based on the second sound diversity signal.

According to an optional aspect, the sound quality diversity portion may prepare the first sound diversity signal based on the source signal prepared by the notice sound preparation portion, using a highpass filter being an electronic filter that passes the source signal with frequencies higher than a predetermined first cutoff frequency but attenuates the source signal with frequencies not higher than the predetermined first cutoff frequency. The sound quality diversity portion may prepare the second sound diversity signal based on the source signal prepared by the notice sound preparation portion, using a lowpass filter (36b) being an electronic filter that passes the source signal with frequencies lower than a predetermined second cutoff frequency but attenuates the source signal with frequencies not lower than the second cutoff frequency.

According to an optional aspect, the sound quality diversity portion may prepare the second sound diversity signal based on the source signal prepared by the notice sound preparation portion, using a lowpass filter being an electronic filter that passes the source signal with frequencies lower than a predetermined second cutoff frequency but attenuates the source signal with frequencies not lower than the second cutoff frequency. The sound quality diversity portion may prepare the first sound diversity signal identical to the source signal prepared by the notice sound preparation portion, by causing the source signal to bypass the lowpass filter.

According to an optional aspect, the sound quality diversity portion may prepare the first sound diversity signal by attaching a plurality of frequencies that are designated with predetermined first frequency intervals to the source signal prepared by the notice sound preparation portion. The sound quality diversity portion may prepare the second sound diversity signal by attaching a plurality of frequencies that are designated with predetermined second frequency intervals to the source signal prepared by the notice sound preparation portion, the second frequency intervals being different from the first frequency intervals.

According to an optional aspect, the second directionality of the second speaker may be an omni-directionality, enabling the second speaker directly emitting the notice sound with the second sound quality to full emission angles surrounding the vehicle.

According to an optional aspect, the notice sound having the first sound quality and the notice sound having the second sound quality may be simultaneously audible at a position outside of the vehicle so as to have mutually different sound pressures based on a difference of the first directionality of the first speaker and the second directionality of the second speaker.

According to an optional aspect, the predetermined notice sound may be prepared to simulate an engine sound.

According to an optional aspect, the first speaker may generate the predetermined notice sound with the first sound quality outside of the vehicle based on the first sound diversity signal to be audible with a sound pressure that is increased according to an increase of a speed of the vehicle when the vehicle is moving forward.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A vehicle presence notification apparatus in a vehicle for indicating a presence of the vehicle outward from the vehicle, the apparatus comprising:
   a notice sound preparation portion to prepare a source signal to generate a predetermined notice sound being audible outside of the vehicle;
   a first speaker that has a first directionality;
   a second speaker that has a second directionality that has a broader emission angle as compared with the first directionality of the first speaker; and
   a sound quality diversity portion that prepares a first sound diversity signal and a second sound diversity signal by attaching different frequency characteristics to the source signal prepared by the notice sound preparation portion and inputs the first diversity signal and the second diversity signal to the first speaker and the second speaker, respectively,
   wherein:
   the first speaker generates the predetermined notice sound having a first sound quality outside of the vehicle based on the first sound diversity signal;
   the second speaker generates the predetermined notice sound having a second sound quality outside of the vehicle based on the second diversity signal, the second sound quality being different from the first sound quality; and
   the notice sound having the first sound quality and the notice sound having the second sound quality are simultaneously audible outside of the vehicle.

2. The vehicle presence notification apparatus according to claim 1, wherein:
   the sound quality diversity portion prepares the first sound diversity signal and the second sound diversity signal by attaching the different frequency characteristics to the source signal prepared by the notice sound preparation portion, according to a traveling state of the vehicle.

3. The vehicle presence notification apparatus according to claim 1, wherein:
   before the sound quality diversity portion prepares the first sound diversity signal and the second sound diversity signal by attaching the different frequency characteristics, the source signal prepared by the notice sound preparation portion is attached with a plurality of frequencies, which are designated with predetermined frequency intervals, according to a traveling state of the vehicle.

4. The vehicle presence notification apparatus according to claim 1, wherein:
   the first speaker is a parametric speaker that emits an ultrasonic wave outward from the vehicle, generating the notice sound having the first sound quality to be audible at a position distant from the vehicle, the ultrasonic wave being prepared by performing an ultrasonic modulation on the first sound diversity signal; and
   the second speaker is a dynamic speaker that directly emits the notice sound having the second sound quality outward from the vehicle based on the second sound diversity signal.

5. The vehicle presence notification apparatus according to claim 1, wherein:
   the sound quality diversity portion prepares the first sound diversity signal based on the source signal prepared by the notice sound preparation portion, using a highpass filter being an electronic filter that passes the source signal with frequencies higher than a predetermined first cutoff frequency but attenuates the source signal with frequencies not higher than the predetermined first cutoff frequency; and
   the sound quality diversity portion prepares the second sound diversity signal based on the source signal prepared by the notice sound preparation portion, using a lowpass filter being an electronic filter that passes the source signal with frequencies lower than a predetermined second cutoff frequency but attenuates the source signal with frequencies not lower than the second cutoff frequency.

6. The vehicle presence notification apparatus according to claim 1, wherein:
   the sound quality diversity portion prepares the second sound diversity signal based on the source signal prepared by the notice sound preparation portion, using a lowpass filter being an electronic filter that passes the source signal with frequencies lower than a predetermined second cutoff frequency but attenuates the source signal with frequencies not lower than the second cutoff frequency; and
   the sound quality diversity portion prepares the first sound diversity signal identical to the source signal prepared by the notice sound preparation portion, by causing the source signal to bypass the lowpass filter.

7. The vehicle presence notification apparatus according to claim 1, wherein:
   the sound quality diversity portion prepares the first sound diversity signal by attaching a plurality of frequencies that are designated with predetermined first frequency intervals to the source signal prepared by the notice sound preparation portion; and
   the sound quality diversity portion prepares the second sound diversity signal by attaching a plurality of frequencies that are designated with predetermined second frequency intervals to the source signal prepared by the notice sound preparation portion, the second frequency intervals being different from the first frequency intervals.

8. The vehicle presence notification apparatus according to claim 1, wherein:

the second directionality of the second speaker is an omni-directionality, enabling the second speaker directly emitting the notice sound with the second sound quality to full emission angles surrounding the vehicle.

9. The vehicle presence notification apparatus according to claim 1, wherein:

the notice sound having the first sound quality and the notice sound having the second sound quality are simultaneously audible at a position outside of the vehicle so as to have mutually different sound pressures based on a difference of the first directionality of the first speaker and the second directionality of the second speaker.

10. The vehicle presence notification apparatus according to claim 1, wherein:

the predetermined notice sound is prepared to simulate an engine sound.

11. The vehicle presence notification apparatus according to claim 1, wherein:

the first speaker generates the predetermined notice sound with the first sound quality outside of the vehicle based on the first sound diversity signal to be audible with a sound pressure that is increased according to an increase of a speed of the vehicle when the vehicle is moving forward.

12. A vehicle presence notification apparatus in a vehicle for indicating a presence of the vehicle outward from the vehicle, the vehicle presence notification apparatus comprising:

a first speaker having a first directionality, the first speaker being a parametric speaker that emits an ultrasonic wave, which is prepared by performing an ultrasonic modulation on a signal, outward from the vehicle;

a second speaker having a second directionality having a broader emission angle as compared with the first directionality of the first speaker, the second speaker being a dynamic speaker that directly emits a sound; and a notice sound preparation portion to prepare a source signal by attaching a predetermined notice sound with a plurality of frequencies, which are designated with predetermined frequency intervals, according to a traveling state of the vehicle, the notice sound preparation portion then inputting the source signal to each of the first speaker and the second speaker, wherein:

the first speaker emits an ultrasonic wave outward from the vehicle to generate the notice sound with the plurality of frequencies to be audible at a position distant from the vehicle, the ultrasonic wave being prepared by performing an ultrasonic modulation on the source signal; and the second speaker emits the notice sound with the plurality of frequencies directly outward from the vehicle based on the source signal.

13. The vehicle presence notification apparatus according to claim 12, wherein:

the first speaker performs an increase of a sound pressure of the predetermined notice sound such that the predetermined notice sound is generated based on the source signal outside of the vehicle to be audible with a sound pressure that is increased according to an increase of a speed of the vehicle only when the vehicle moves forward; and the second speaker maintains a sound pressure of the predetermined notice sound regardless of the travel state of the vehicle.

* * * * *